(12) United States Patent
Dutt et al.

(10) Patent No.: US 11,076,219 B2
(45) Date of Patent: Jul. 27, 2021

(54) AUTOMATED CONTROL OF NOISE REDUCTION OR NOISE MASKING

(71) Applicant: BOSE CORPORATION, Framingham, MA (US)

(72) Inventors: Anuj Dutt, Framingham, MA (US); Nathan Blagrove, Wayland, MA (US); Marko Orescanin, Salinas, CA (US); Somasundaram Meiyappan, Chennai (IN)

(73) Assignee: BOSE CORPORATION, Framingham, MA (US)

( * ) Notice: Subject to any disclaimer, the term of this patent is extended or adjusted under 35 U.S.C. 154(b) by 199 days.

(21) Appl. No.: 16/382,926

(22) Filed: Apr. 12, 2019

(65) Prior Publication Data

US 2020/0329297 A1 Oct. 15, 2020

(51) Int. Cl.
*H04R 1/10* (2006.01)
*G10L 15/187* (2013.01)
(Continued)

(52) U.S. Cl.
CPC ......... *H04R 1/1083* (2013.01); *G06F 40/268* (2020.01); *G06F 40/279* (2020.01); *G06F 40/295* (2020.01); *G10L 15/187* (2013.01); *G10L 15/20* (2013.01); *G10L 15/26* (2013.01); *G10L 21/02* (2013.01); *H04R 1/083* (2013.01);
(Continued)

(58) Field of Classification Search
CPC .. H04R 1/083; H04R 1/1083; H04R 2420/07; G10L 15/187; G10L 15/20; G10L 15/26; G10L 21/02; G10L 21/0208; G10L 25/78; G10L 25/84; G10L 2015/025; G06F 40/268; G06F 40/279; G06F 40/295
See application file for complete search history.

(56) References Cited

U.S. PATENT DOCUMENTS 5,754,454 A * 5/1998 Pixley ................. G06F 30/3323
702/123
6,980,954 B1 * 12/2005 Zhao ....................... G10L 15/08
704/251

(Continued)

FOREIGN PATENT DOCUMENTS

WO 2009101319 A1 8/2009

OTHER PUBLICATIONS

Tsankov, A. M., Brown, C. R., Yu, M. C., Win, M. Z., Silver, P. A., & Casolari, J. M., "Communication between levels of transcriptional control improves robustness and adaptivity.", 2006 Molecular Systems Biology, 2, 65. doi:http://dx.doi.org/10.1038/msb4100106 (Year: 2006).*

(Continued)

*Primary Examiner* — Eric Yen
(74) *Attorney, Agent, or Firm* — Patterson + Sheridan, LLP (57) ABSTRACT

A method is provided for controlling external noise in an audio output device. A speech signal is detected in the vicinity of the audio output device. The speech signal is transcribed into text. The transcribed text is compared with reference text. When at least a portion of the transcribed text matches with a portion of the reference text, it is determined to reduce at least one of a level of active noise reduction or a level of noise masking to enable a user of the audio output device to hear sounds external to the audio output device.

20 Claims, 3 Drawing Sheets

(51) Int. Cl.
*H04R 1/08* (2006.01)
*G10L 15/20* (2006.01)
*G06F 40/268* (2020.01)
*G06F 40/279* (2020.01)
*G10L 15/26* (2006.01)
*G06F 40/295* (2020.01)
*G10L 21/02* (2013.01)
*G10L 15/02* (2006.01)

(52) U.S. Cl.
CPC .... *G10L 2015/025* (2013.01); *H04R 2420/07* (2013.01)

(56) References Cited

U.S. PATENT DOCUMENTS

| | | | | |
|---|---|---|---|---|
| 8,892,422 | B1* | 11/2014 | Kumar | G06F 40/289 |
| | | | | 704/9 |
| 8,954,325 | B1* | 2/2015 | Bokish | G10L 15/07 |
| | | | | 704/244 |
| 9,398,367 | B1 | 7/2016 | Scott et al. | |
| 9,697,827 | B1* | 7/2017 | Lilly | G10L 15/14 |
| 10,074,356 | B1* | 9/2018 | Sarkar | H04R 27/00 |
| 10,140,973 | B1* | 11/2018 | Dalmia | G06F 40/247 |
| 10,628,483 | B1* | 4/2020 | Rao | G06F 16/3334 |
| 2009/0210227 | A1* | 8/2009 | Sugiyama | G10L 15/22 |
| | | | | 704/246 |
| 2009/0220056 | A1* | 9/2009 | Simpson | H04M 3/493 |
| | | | | 379/88.03 |
| 2011/0276326 | A1* | 11/2011 | Fumarolo | H04M 3/527 |
| | | | | 704/235 |
| 2012/0022863 | A1* | 1/2012 | Cho | G10L 15/14 |
| | | | | 704/233 |
| 2013/0035932 | A1* | 2/2013 | Bangalore | G06F 40/30 |
| | | | | 704/9 |
| 2014/0114661 | A1* | 4/2014 | Mengibar | G06F 16/24522 |
| | | | | 704/244 |
| 2014/0379386 | A1* | 12/2014 | Drennan, III | G06F 16/2465 |
| | | | | 705/4 |
| 2017/0053650 | A1* | 2/2017 | Ogawa | G10L 15/063 |
| 2017/0111465 | A1* | 4/2017 | Yellin | H04L 67/1076 |
| 2018/0315428 | A1* | 11/2018 | Johnson | G10L 15/01 |
| 2018/0374470 | A1* | 12/2018 | Sarkar | G10K 11/178 |
| 2019/0153522 | A1* | 5/2019 | Trautman | C12Q 1/44 |
| 2019/0163692 | A1* | 5/2019 | Duan | G06F 16/3329 |
| 2019/0272834 | A1* | 9/2019 | Brenner | G10L 25/51 |
| 2020/0143247 | A1* | 5/2020 | Jonnalagadda | G06F 40/284 |
| 2020/0296521 | A1* | 9/2020 | Wexler | G06K 9/00248 |
| 2020/0356556 | A1* | 11/2020 | Tang | G06F 16/248 |
| 2020/0409961 | A1* | 12/2020 | Arunmozhi | G06N 20/00 |

OTHER PUBLICATIONS

Gartenberg, Chaim, "Amazon Patents Noise-Canceling Headphones That Let You Hear Your Name", The Verge, Aug. 1, 2016.
Solon, Olivia, "Amazon Plans Headphones That Know When Someone Says Your Name—Noise-Canceling Headphones Can Make it Hard to Hear When a Person Actually Needs your Attention, and Amazon Wants to Fix That", The Guardian, Aug. 1, 2016.
International Search Report and Written Opinion for International Application No. PCT/US2020/025148 dated Aug. 3, 2020; 9 pp.

\* cited by examiner

AUTOMATED CONTROL OF NOISE REDUCTION OR NOISE MASKING

FIELD

Aspects of the disclosure generally relate to automated control of noise reduction and/or noise masking, and more specifically to techniques for reducing noise reduction and/or noise masking in an audio output device based on detection of configured keywords uttered in the vicinity of the audio output device.

BACKGROUND

Audio devices with voice-controlled user interfaces monitor a sound field for a special cue to activate features. In some examples, the cue is known as a trigger word, a Wake-Up Word (WUW), or hotword. Accurate detection of a WUW enables voice-controlled user interfaces to properly function. For example, accurate detection allows a user to selectively activate features, such as voice-activated control of the audio device. However, such a device is generally pre-trained to recognize only certain words or phrases and cannot be customized by the user to recognize words or phrases other than what the device is pre-configured to recognize without any pre-training. Accordingly, methods for accurately and efficiently recognizing customized speech, as well as apparatuses and systems configured to implement these methods are desired.

SUMMARY

All examples and features mentioned herein can be combined in any technically possible manner.

Aspects of the present disclosure provide a method for controlling reproduction of external noise in an audio output device. The method generally includes detecting a speech signal in the vicinity of the audio output device; transcribing the speech signal into text; comparing the transcribed text with reference text; and when at least a portion of the transcribed text matches with a portion of the reference text, determining to reduce at least one of a level of active noise reduction or a level of noise masking to enable a user of the audio output device to hear sounds external to the audio output device.

In an aspect, the method further includes determining that at least a portion of the transcribed text matches with a portion of the reference text when at least one word or number from the transcribed text matches with a corresponding word or number respectively from the reference text.

In an aspect, the method further includes converting each word from the transcribed text to corresponding phonemes.

In an aspect, the comparing comprises comparing phonemes of each word from the transcribed text to phonemes of each word from the reference text, further comprising determining that at least a portion of the transcribed text matches with a portion of the reference text when phonemes corresponding to at least one word from the transcribed text matches with phonemes of a word from the reference text.

In an aspect, the comparing comprises determining a degree of similarity between phonemes of each word from the transcribed text and the phonemes of each word from the reference text, wherein the method further comprises determining that at least a portion of the transcribed text matches with a portion of the reference text when the determined degree of similarity between phonemes of at least one word from the reference text and a word from the reference text satisfies a threshold for the degree of similarity.

In an aspect, the degree of similarity is represented by an integer.

In an aspect, the threshold for the degree of similarity is satisfied when the determined degree of similarity is below a threshold integer value.

In an aspect, the method further includes obtaining at least one word, at least one number or a combination thereof as part of the reference text.

In an aspect, the obtaining comprises at least one of receiving at least a portion of the reference text as textual input via a user interface; receiving at least a portion of the reference text as speech input via a user interface, wherein the speech input is transcribed into text to be used as part of the reference text; or obtaining at least a portion of the reference text extracted from user data.

Aspects of the present disclosure provide an audio output device for controlling reproduction of external noise in the audio output device. The audio output device generally includes at least one microphone to detect sounds in the vicinity of the audio output device; at least one processor and at least one of a noise reduction circuit to reduce the level of active noise reduction in response to the determination, or a noise masking circuit to reduce the level of noise masking in response to the determination. The at least one processor is generally configured to detect a speech signal from the sounds in the vicinity of the audio output device; transcribe the speech signal into text; compare the transcribed text with reference text; and when at least a portion of the transcribed text matches with a portion of the reference text, determine to reduce at least one of a level of active noise reduction or a level of noise masking to enable a user of the audio output device to hear sounds external to the audio output device.

In an aspect, the at least one processor is configured to determine that at least a portion of the transcribed text matches with a portion of the reference text when at least one word or number from the transcribed text matches with a corresponding word or number respectively from the reference text.

In an aspect, the at least one processor is further configured to convert each word from the transcribed text to corresponding phonemes.

In an aspect, the at least one processor is configured to compare phonemes of each word from the transcribed text to phonemes of each word from the reference text, and wherein the at least one processor is configured to determine that at least a portion of the transcribed text matches with a portion of the reference text when phonemes corresponding to at least one word from the transcribed text matches with phonemes of a word from the reference text.

In an aspect, the at least one processor is configured to determine a degree of similarity between phonemes of each word from the transcribed text and the phonemes of each word from the reference text, wherein the at least one processor is configured to determine that at least a portion of the transcribed text matches with a portion of the reference text when the determined degree of similarity between phonemes of at least one word from the reference text and a word from the reference text satisfies a threshold for the degree of similarity.

In an aspect, the degree of similarity is represented by an integer.

In an aspect, the threshold for the degree of similarity is satisfied when the determined degree of similarity is below a threshold integer value.

In an aspect, the at least one processor is configured to obtain at least one word, at least one number or a combination thereof as part of the reference text.

In an aspect, the audio output device further includes a communication interface for at least one of: receiving at least a portion of the reference text as textual input via a user interface; or receiving at least a portion of the reference text as speech input via a user interface, wherein the at least one processor is configured to transcribe the speech input into text for use as part of the reference text.

Aspects of the present disclosure provide apparatus for controlling reproduction of external noise in an audio output device. The apparatus generally includes at least one processor and a memory coupled to the at least one processor. The at least one processor is generally configured to obtain reference text comprising at least one word, at least one number or a combination thereof; detect a speech signal in the vicinity of the audio output device; transcribe the speech signal into text; compare the transcribed text with reference text; and when at least a portion of the transcribed text matches with a portion of the reference text, determine to reduce at least one of a level of active noise reduction or a level of noise masking to enable a user of the audio output device to hear sounds external to the audio output device.

In an aspect, the at least one processor is configured to determine that at least a portion of the transcribed text matches with a portion of the reference text when at least one word or number from the transcribed text matches with a corresponding word or number respectively from the reference text.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

DETAILED DESCRIPTION

Audio output devices having noise cancelling and/or noise masking capabilities have steadily increased in popularity. Modern headphones with active noise reduction (ANR) (sometimes referred to as active noise cancelling (ANC)) capabilities can attenuate sounds external to the headphones to provide an immersive audio experience to the user. However, there may be certain situations when a user wearing the headphones with ANR turned on and set to a high level may want or need to hear certain external sounds for situational awareness.

In one example use case, when a user wearing headphones with ANC set to high is called out by another subject (e.g., another person) using the user's name or an alias, the user may desire that the noise cancelling is at least temporarily interrupted and the user is made aware of the subject.

In another example use case, when the user wearing the headphones with ANC set to high is at an airport waiting to board a flight, the user may desire that the noise cancelling is interrupted when announcements pertaining to the user's flight are made or other information is announced that may be of interest to the user.

In another example use case, when the user wearing the headphones with ANC set to high is on a flight, the user may desire that the noise cancelling is interrupted when a flight attendant is trying to get the user's attention by speaking the user's name (e.g., "Hello Mr. "user's name"") or when an inflight announcement is made.

In certain aspects, the task of providing at least temporary situational awareness to the user in the above discussed use cases and other similar use cases may be accomplished by configuring the user device (e.g., the headphones or other wearable audio device) to recognize certain pre-configured keywords (e.g., words, digit, or combination thereof), and controlling (e.g., interrupting) noise cancellation or noise masking in response to a detected keyword. In an aspect, a user may specify the keywords that the user desires to be recognized for triggering, at least, temporary interruption the noise cancellation or noise masking.

A pure acoustics approach may be used to compare a candidate speech signal (e.g., speech uttered by a subject and received by at least one microphone of a user device) to a set of keywords (e.g., words, digit, or combination thereof) configured for detection. For example, for each digit/word to be recognized, multiple samples may be recorded from different people in different environments to account for variability in the speech data. Features of each recorded sample may be compared to features extracted from the candidate speech signal, in an attempt to recognize from the candidate speech signal one or more of the set of keywords configured for recognition. For example, Mel Frequency Cepstral Coefficients (MFCCs) and log spectrograms of the candidate and recorded signals may be used for the comparisons.

There are certain limitations associated with using a pure acoustics approach for recognition of certain configured keywords which may lead to inaccurate recognition of the keywords including false positives and false negatives. For instance, every person has a unique style of speaking including different accents, different pitches and different voice qualities based on gender and age. Additionally, different environments affect the speech signal. The MFCC and log spectrograms based comparison may fail for different environments and/or variations of voice.

Certain aspects of the present disclosure provide improved techniques for recognition of pre-configured keywords (e.g., words, numbers, or combinations thereof) from a candidate speech signal using a combination of automatic speech recognition (ASR) and natural language processing (NLP) approaches, and controlling external noise in an audio output device based on the recognition.

Figure 1:
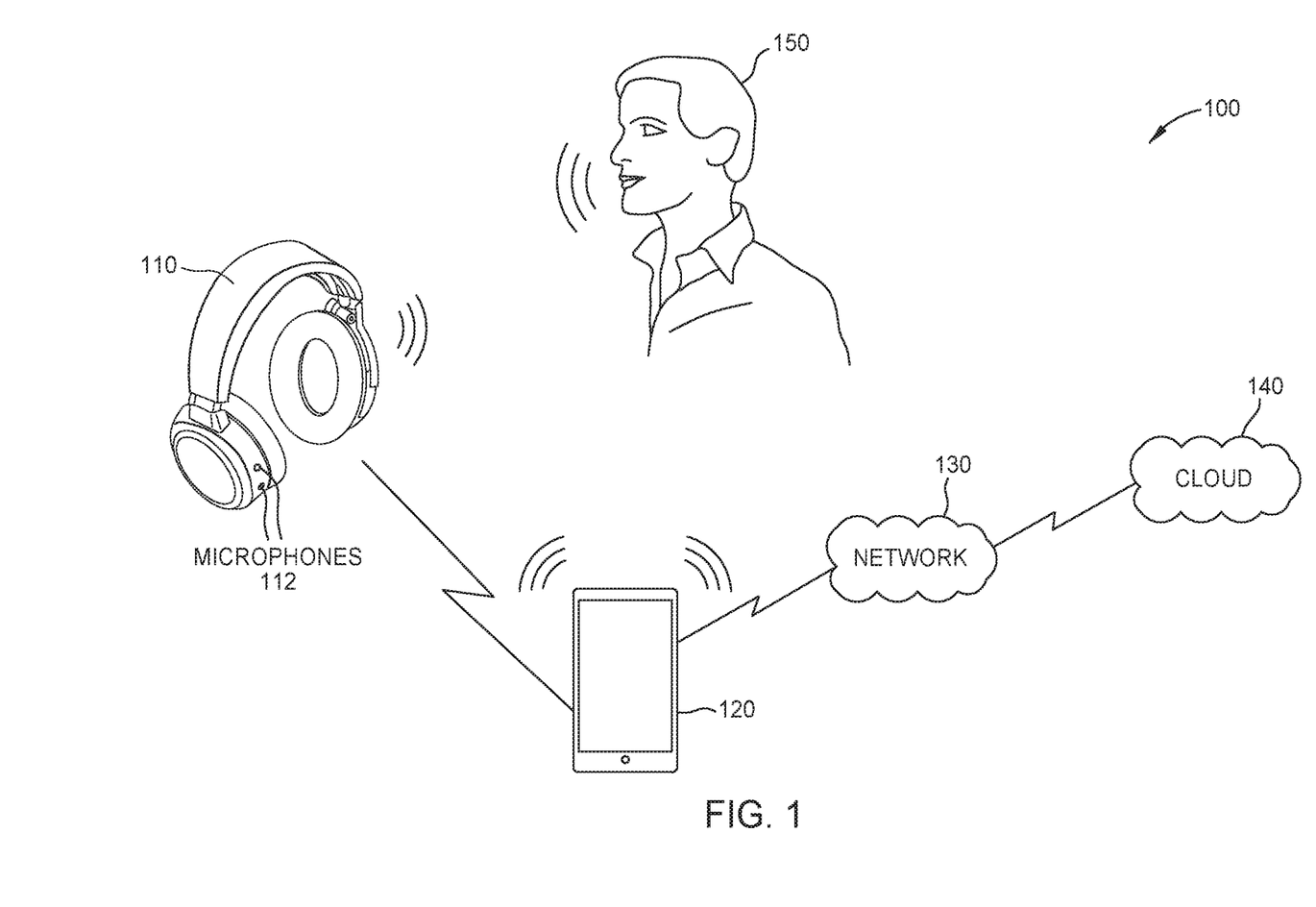
FIG. 1 illustrates an example system in which aspects of the present disclosure may be practiced.

FIG. 1 illustrates an example system 100 in which aspects of the present disclosure may be practiced.

As shown, system 100 includes a pair of headphones 110 communicatively coupled with a portable user device 120. In an aspect, the headphones 110 may include one or more microphones 112 to detect sound in the vicinity of the headphones 110. The headphones 110 also include at least one acoustic transducer (also known as driver or speaker) for outputting sound. The included acoustic transducer(s) may be configured to transmit audio through air and/or through bone (e.g., via bone conduction, such as through the bones of the skull). The headphones 110 may further include hardware and circuitry including processor(s)/processing system and memory configured to implement one or more sound management capabilities including, but not limited to, noise cancelling circuitry (not shown) and/or noise masking circuitry (not shown). The noise cancelling circuitry is configured to reduce unwanted ambient sounds external to the headphones 110 by using active noise cancelling. The sound masking circuitry is configured to reduce distractions by playing masking sounds via the speakers of the headphones 110.

In an aspect, the headphones 110 include voice activity detection (VAD) circuitry capable of detecting the presence of speech signals (e.g. human speech signals) in a sound signal received by the microphones 112 of the headphones 110. For instance, as shown in FIG. 1, the microphones 112 of the headphones 110 may receive ambient external sounds in the vicinity of the headphones 110, including speech uttered by a non-user subject 150. Thus, the sound signal received by the microphones 112 has the speech signal mixed in with other sounds in the vicinity of the headphones 110. Using the VAD, the headphones 110 may detect and extract the speech signal from the received sound signal.

In an aspect, the headphones 110 are wirelessly connected to the portable user device 120 using one or more wireless communication methods including but not limited to Bluetooth, Wi-Fi, Bluetooth Low Energy (BLE), other radio frequency (RF)-based techniques, or the like. In an aspect, the headphones 110 include a transceiver that transmits and receives information via one or more antennae to exchange information with the user device 120.

In an aspect, the headphones 110 may be connected to the portable user device 120 using a wired connection, with or without a corresponding wireless connection. As shown, the user device 120 may be connected to a network 130 (e.g., the Internet) and may access one or more services over the network. As shown, these services may include one or more cloud services 140.

The portable user device 120 is representative of a variety of computing devices, such as mobile telephone (e.g., smart phone) or a computing tablet. In an aspect, the user device 120 may access a cloud server in the cloud 140 over the network 130 using a mobile web browser or a local software application or "app" executed on the user device 120. In an aspect, the software application or "app" is a local application that is installed and runs locally on the user device 120. In an aspect, a cloud server accessible on the cloud 140 includes one or more cloud applications that are run on the cloud server. The cloud application may be accessed and run by the user device 120. For example, the cloud application may generate web pages that are rendered by the mobile web browser on the user device 120. In an aspect, a mobile software application installed on the user device 120 and a cloud application installed on a cloud server, individually or in combination, may be used to implement the techniques for keyword recognition in accordance with aspects of the present disclosure.

It may be noted that although certain aspects of the present disclosure discuss keyword recognition by headphones 110 for exemplary purposes, any wearable audio output device with similar capabilities may be interchangeably used in these aspects. For instance, a wearable audio output device usable with techniques discussed herein may include over-the-ear headphones, audio eyeglasses or frames, in-ear buds, around-ear audio devices, or the like.

Figure 2:
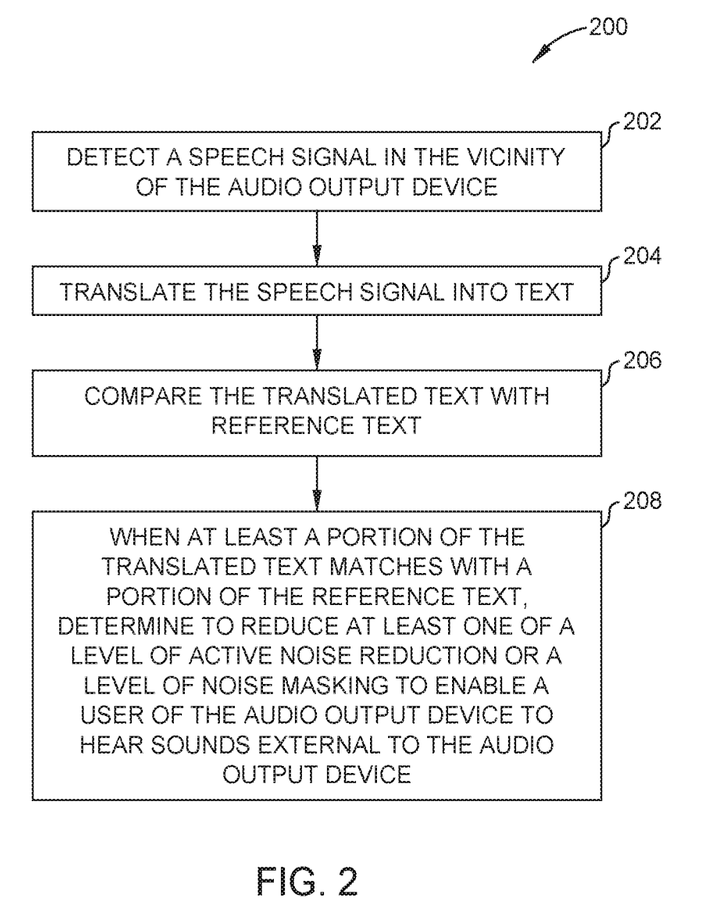
FIG. 2 illustrates example operations for controlling external noise in an audio output device, in accordance with certain aspects of the present disclosure.

FIG. 2 illustrates example operations 200 for controlling external noise in an audio output device, in accordance with certain aspects of the present disclosure.

Operations 200 begin, at 202, by detecting a speech signal in the vicinity of the audio output device. At 204, the detected speech signal is transcribed into text. At 206, the transcribed text is compared with reference text. At 208, when at least a portion of the transcribed text matches with a portion of the reference text, it is determined to reduce at least one of a level of active noise reduction or a level of noise masking to enable a user of the audio output device to hear sounds external to the audio output device.

In an aspect, reducing a level of noise masking includes reducing a volume level of a masking sound, or pausing or stopping a masking sound.

Figure 3:
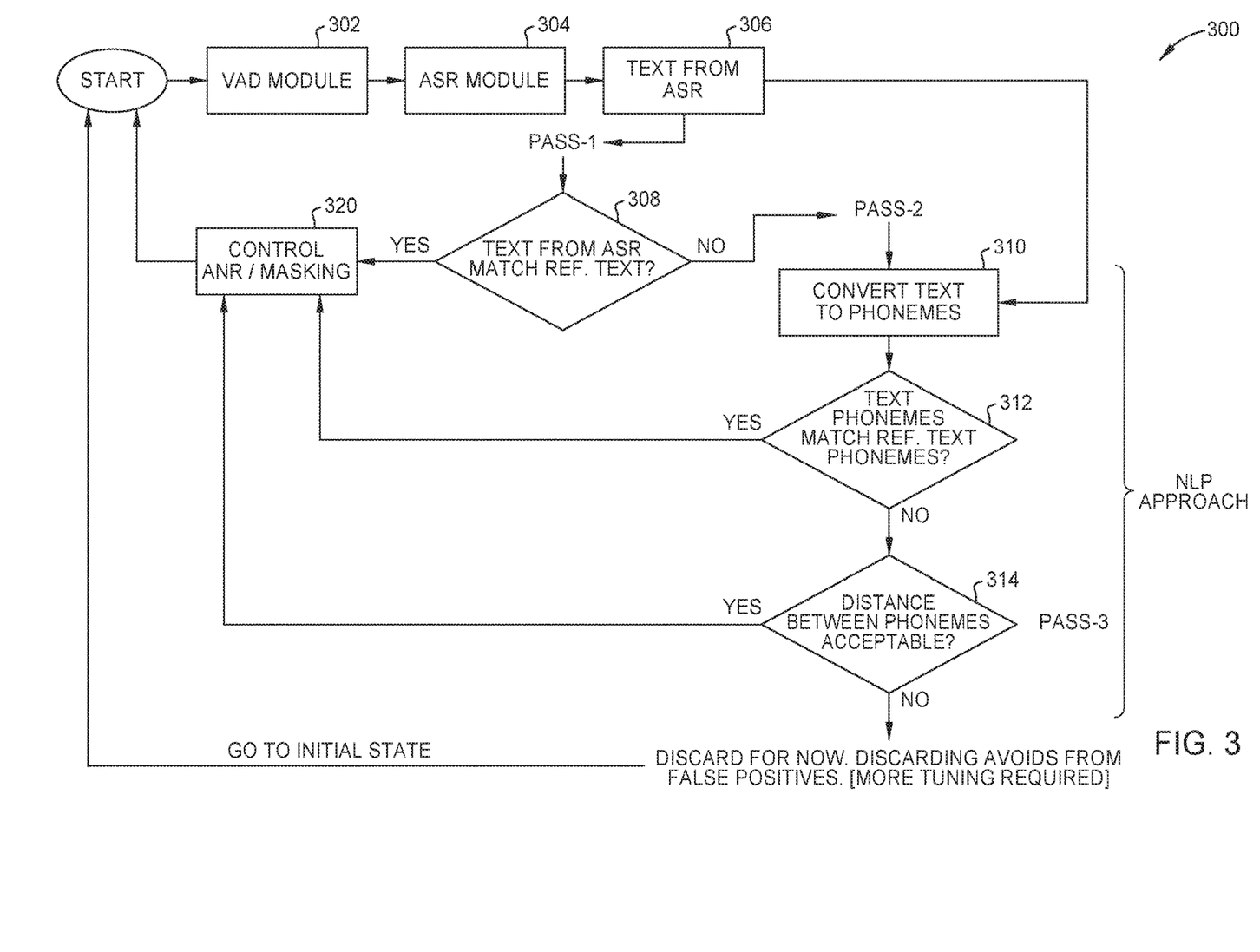
FIG. 3 illustrates an example implementation of the techniques for recognizing keywords and controlling noise in an audio output device, in accordance with certain aspects of the present disclosure.

FIG. 3 illustrates an example implementation 300 of the techniques for recognizing keywords and controlling noise in an audio output device, in accordance with certain aspects of the present disclosure. The example implementation 300 will be described with reference to the system 100 as shown in FIG. 1.

In certain aspects, a user may configure one or more keywords (reference text of FIG. 2) that the user desires to be recognized in order to trigger attenuating noise cancelling and/or noise masking in the audio headphones 110. In an aspect, a keyword may include one or more words (including phrases), numbers or combinations thereof. In an aspect, the user may configure the keywords in a number of ways. In one aspect, a software application installed on the user device 120 may provide an interface using which the user may provide the keywords. For example, the user may enter one or more keywords in a keywords field provided by the interface. These keywords may include strings separated by a comma, semicolon, colon, hyphen or the like (e.g., Nate, Nathan, Natey, Flight 1234, Hello, Hello Sir, Excuse me, Excuse me Sir, etc.) It may be noted that this example list of keywords is not an exhaustive list and the user may enter any number of keywords including one or more words, numbers or combinations thereof. In another aspect, additionally or alternatively, the user may provide the keywords using voice input. For instance, the software application installed on the user device 120 may include a voice recognition capability and may allow the user to provide the keywords via voice input. An automatic speech recognition (ASR) module of the software application may transcribe the voice input into text keywords for use in future recognition. In another aspect, additionally or alternatively, one or more the software application may automatically configure one or more keywords for the recognition. For instance, keywords may be automatically extracted from the user's email, text messages or other documents stored in the user device 120. For example, flight numbers may be extracted from emails in the user's email inbox confirming flight reservations, and the extracted flight numbers may be used as keywords for recognition and triggering the attenuation of noise cancelling and/or noise masking, for example, when information related to the user's flight number is announced at the airport. In another aspect, additionally or alternatively, the software application may use machine learning techniques to derive context of the user's environment and select and use appropriate keywords for the recognition.

In certain aspects, the algorithm of the example implementation 300 is triggered by one or more microphones 112 receiving a sound signal and the VAD module 302 detecting a valid speech signal (e.g., spoken by a non-user speaker 150) from the received sound signal. In an aspect, the VAD module is configured to measure sound energies of the received sound signal and detect the existence of a speech signal in the received sound signal when the measured sound energies correspond to sound energies typical of human speech signal. Additionally or alternatively, the VAD module is configured to detect speech signals generated by an artificial source such as speakers of a public announcement system. In an aspect, detection of a valid speech signal avoids noise input to the system and resulting false triggers. In the example implementation 300 of FIG. 3, the VAD module 302 is implemented by VAD circuitry within the headphones 110. However, it may be envisioned that the VAD module 302 may be implemented by hardware, firmware, software or a combination thereof within the headphones 110, the user device 120 or any other device communicatively coupled with the headphones 110. In the case where the VAD module 302 is implemented in the user device 120, the sound signals received by the one or more microphones 112 of the headphones 110 may be sent via a wireless or wired link to the user device 120 for processing by the VAD module. In an aspect, the microphones 112 of the headphones 110 continually receive ambient sound signals in the vicinity of the headphones and feed the received sound signals to the VAD module 302 for detection of speech signals. In an aspect, the headphones are capable of detecting whether the user is wearing the headphones, and enable the microphones and the VAD module to receive and detect speech signals only when the user is wearing the headphones 110. In an aspect, the headphones 110 may have one or more sensors (e.g., one or more accelerometers, one or more magnetometers and/or one or more gyroscopes) for detecting whether the user is wearing the headphones 110 (e.g., as required for the algorithm work effectively).

In an aspect, the valid speech signal detected by the VAD module 302 is transcribed into text by an ASR module 304. In an aspect, the text extracted by the ASR module 304 may include one or more words, numbers, or combinations thereof. In the example implementation 300, the headphones 110 send the detected speech signal to the user device 120 using a wired connection or a wireless connection (e.g., Bluetooth, BLE, Wi-Fi, etc.), and the remaining processing related to the algorithm for attempting to recognize a keyword from the detected speech signal takes place in the user device, a cloud server, or a combination thereof. However, it may be envisioned that the headphones 110 may be configured to perform the entire processing or at least a portion of the processing.

As shown in the example implementation 300, the algorithm for recognizing configured keywords from the detected speech signal uses three different methods (shown as Pass-1, Pass-2 and Pass-3) for recognizing the keywords from the candidate speech signal. Each of the three passes (Pass-1, Pass-2 and Pass-3) uses a different approach to compare the text extracted by the ASR module with the configured keywords. In an aspect, by checking the extracted ASR text from the candidate speech signal with the keywords using the three different methods discussed herein avoids false negatives (e.g., a valid word not identified as a valid match) by accounting for variations in accents, environments, pronunciations etc. In an aspect, Pass-1 uses a direct matching method for comparing the ASR text with reference text, while Pass-2 and Pass-3 use a Natural Language Processing (NLP) method for detecting a configured keyword in the ASR text.

As shown in FIG. 3, the ASR text 306 obtained from the candidate speech signal is first processed according to the Pass-1 method. As shown, at 308, each word or number from the ASR text 306 is matched with each keyword (or reference text) pre-configured for recognition. In an aspect, if at least one word or number directly matches with a corresponding at least one word or number of a configured keyword, the algorithm determines that a keyword has been detected, and triggers ANR and/or masking control at 320.

When the algorithm does not detect a direct match between the ASR text and reference text during Pass-1, the algorithm proceeds to process the ASR text 306 according to the Pass-2 method in which words of the ASR text are compared with words of the reference text at a phonetic level. As shown, in Pass-2 each word of the ASR text is converted to corresponding phonemes at 310. For example, the name "ANUJ" in may be represented by phonemes as "[['AE1', 'N', 'Y', 'UW1', 'JH', 'EY1'], ['AH0', 'N', 'Y', 'UW1', 'JH', 'EY1']]".

At 312, phonemes of each word from the ASR text are compared with phonemes of each word in the reference text. In an aspect, comparing words at the phonetic level avoids false negatives when words are same at the phonetic level but differ from each other at a text level. For example, the user may pre-configure the name "Rick" for recognition. However, the ASR module 304 may transcribe the name "Rick" uttered by the subject 150 as text "Ric". The words "Ric" and "Rick" will generate a negative match result based on direct text comparison. However, the words "Ric" and "Rick" may be represented by the same set of phonemes, for example, [['R', 'IH1', 'K']], indicating that the words "Ric" and "Rick" are same at the phonetic level. Thus, even if a direct text match of "Ric" and "Rick" in Pass-1 will generate a negative match, comparing them at the phonetic level in Pass-2 will generate a positive match, thus avoiding a false negative.

At 312, if the ASR text 306 and the reference text match at the phonetic level, the algorithm determines that a keyword has been detected, and triggers ANR and/or masking control at 320.

When the algorithm does not detect a match between the ASR text and the reference text at 312, the algorithm proceeds to process the ASR text 306 according to the Pass-3 method in which a match between the ASR text and the reference text is determined based on the degree of similarity between phonemes of each word in the ASR text and phonemes of words in the reference text. In other words, Pass-3 determines the degree of similarity in how two words are pronounced. In an aspect, for this method of comparison, the algorithm may use an existing phonetic algorithm such as Soundex or Metaphone which index names by sound as pronounced in English. At 314, each word of the ASR text is compared with each word of the reference text based on the phonetic algorithm, and a distance is determined between each pair of compared words, where the determined distance is represented by an integer. Table-1 shows distances between pairs of compared words, as determined based on a phonetic algorithm. The column "Name-1" includes words from the ASR text 306, the column "Name-2" includes words from the reference text, and the column "Distance" includes an integer distance between words of the corresponding row. In an aspect, a lower integer value indicates a higher degree of similarity in how two words are pronounced. On the other hand, a higher integer value indicates higher dissimilarity in how two words are pronounced.

TABLE 1

| NAME-1 | NAME-2 | DISTANCE |
|---|---|---|
| Ric | Rick | 0 |
| Nate | Nathan | 1 |
| Ric | Anuj | 4 |

As shown in Table-1, the words "Ric" and "Rick" sound very similar, and thus are assigned an integer value of '0' indicating high similarity in their pronunciations. The words "Nate" and "Nathan" sound slightly different, and thus are assigned a higher integer value of '1' indicating a slightly lower similarity in their pronunciations. However, the words "Ric" and "Anuj" do not sound similar at all, and thus are assigned a high integer value of '4' indicating high dissimilarity in their pronunciations.

In certain aspects, the algorithm may determine that two words are a positive match if a corresponding determined distance is within a predetermined range of integer values. For example, the algorithm may determine that two words are a positive match if a corresponding determined distance is either '0' or '1' ensuring that only words with high degree of similarity in their pronunciations are determined as positive matches.

At 314, if the ASR text 306 and the reference text match based on the distance values of their pronunciations, the algorithm determines that a keyword has been detected, and triggers ANR and/or masking control at 320.

However, when the algorithm does not detect a match between the ASR text and the reference text at 314, the algorithm discards the ASR text and returns the system to its initial state.

In an aspect, controlling ANR/Masking includes setting the ANR/Masking to a preconfigured level so the user is able to hear sounds external to the headphones and is aware of the subject 150 or speech produced by other artificial sources (e.g., public address system) that the user should be aware of. In an aspect, triggering the ANR/masking control based on a valid match between the ASR text 306 and reference text includes the user device 120 sending a command to the headphones 110 to set the ANR/masking to the pre-determined level.

In certain aspects, once the ANR/masking control is triggered by setting the ANR/masking to a predetermined level, the set level may be maintained for at least one of a pre-configured time period, until the user manually resets the ANR/masking (e.g., to a higher level), until no speech is detected in the vicinity of the user, or the user takes off the headphones. In an aspect, as noted above, sensors on the headphones (e.g., one or more accelerometers, one or more magnetometers and/or one or more gyroscopes) may detect whether the user is wearing the headphones.

In certain aspects, in order to save power, the algorithm discussed in the above paragraphs for controlling noise cancelling/noise masking may be selectively enabled to ensure that the algorithm is run only when needed. In an aspect, the algorithm may be automatically enabled based on detection of a particular acoustic environment of the user. In an aspect, an acoustic environment of the user may be detected based on external sounds/noise detected by one or more microphones of the headphones typical of an acoustic environment. Acoustic environments that may trigger enabling the algorithm may include detecting the user is in a mode of transport (e.g., bus, train, airplane, etc.), detecting the user is at a commuter station (e.g., bus station, train station, airplane), detecting the user is in an office environment or the like. For example, the algorithm for controlling noise canceling/masking may be enabled when the user is detected as being in a mode of transport or at a commuter station to enable the user to hear announcements being made, for example, on a public address system. In an aspect, higher priority may be given to certain configured keywords in certain acoustic environments. For example, flight numbers may be prioritized for detection when the user is detected as being in an airport. Similarly, user name and aliases may be prioritized for detection when the user is detected as being in an office environment.

In certain aspects, the algorithm discussed in aspects of the present disclosure may be used for different languages, different pronunciations and/or in different environments.

It can be noted that, descriptions of aspects of the present disclosure are presented above for purposes of illustration, but aspects of the present disclosure are not intended to be limited to any of the disclosed aspects. Many modifications and variations will be apparent to those of ordinary skill in the art without departing from the scope and spirit of the described aspects.

In the preceding, reference is made to aspects presented in this disclosure. However, the scope of the present disclosure is not limited to specific described aspects. Aspects of the present disclosure can take the form of an entirely hardware embodiment, an entirely software embodiment (including firmware, resident software, micro-code, etc.) or an embodiment combining software and hardware aspects that can all generally be referred to herein as a "component," "circuit," "module" or "system." Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium can be any tangible medium that can contain, or store a program.

The flowchart and block diagrams in the Figures illustrate the architecture, functionality and operation of possible implementations of systems, methods and computer program products according to various aspects. In this regard, each block in the flowchart or block diagrams can represent a module, segment or portion of code, which comprises one or more executable instructions for implementing the specified logical function(s). In some alternative implementations the functions noted in the block can occur out of the order noted in the figures. For example, two blocks shown in succession can, in fact, be executed substantially concurrently, or the blocks can sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

What is claimed is:

1. A method for controlling reproduction of external noise in an audio output device, comprising:
   detecting a speech signal in the vicinity of the audio output device;
   transcribing the speech signal into text;
   conditionally processing the transcribed text through a three-pass module to determine the transcribed text matches, at least in part, reference text, wherein processing the transcribed text through each pass of the three-pass module decreases probability of a false negative; and
   based on determining the transcribed text matches, at least in part, the reference text reducing at least one of a level of active noise reduction or a level of noise masking to enable a user of the audio output device to hear sounds external to the audio output device.

2. The method of claim 1, wherein:
   conditionally processing the transcribed text through a first pass of the three-pass module comprises comparing the transcribed text with the reference text; and
   determining the transcribed text matches, at least in part, the reference text when at least one word or number from the transcribed text matches with a corresponding word or number respectively from the reference text.

3. The method of claim 1, wherein conditionally processing the transcribed text through a second pass of the three-pass module comprises:
   converting each word from the transcribed text to corresponding phonemes.

4. The method of claim 3, wherein:
   conditionally processing the transcribed text through the second pass of the three-pass module further comprises comparing phonemes of each word from the transcribed text to phonemes of each word from the reference text; and
   determining the transcribed text matches, at least in part, the reference text when phonemes corresponding to at least one word from the transcribed text matches with phonemes of a word from the reference text.

5. The method of claim 3, wherein:
   conditionally processing the transcribed text through a third pass of the three-pass module comprises determining a degree of similarity for each combination of phonemes corresponding to one word from the transcribed text and phonemes corresponding to one word from the reference text; and
   determining the transcribed text matches, at least in part, the reference text when at least one determined degree of similarity satisfies a threshold degree of similarity.

6. The method of claim 5, wherein the degree of similarity for each combination is represented by an integer.

7. The method of claim 6, wherein the threshold degree of similarity is satisfied when the at least one determined degree of similarity is below a threshold integer value.

8. The method of claim 1, further comprising:
   obtaining at least one word, at least one number or a combination thereof as part of the reference text.

9. The method of claim 8, wherein the obtaining comprises at least one of:
   receiving at least a portion of the reference text as textual input via a user interface;
   receiving at least a portion of the reference text as speech input via a user interface, wherein the speech input is transcribed into text to be used as part of the reference text; or
   obtaining at least a portion of the reference text extracted from user data.

10. An audio output device for controlling reproduction of external noise in the audio output device, comprising:
    at least one microphone to detect sounds in the vicinity of the audio output device;
    at least one processor configured to:
      detect a speech signal from the sounds in the vicinity of the audio output device;
      transcribe the speech signal into text;
      conditionally process the transcribed text through a three-pass module to determine the transcribed text matches, at least in part, reference text, wherein each pass of the three-pass module decreases probability of a false negative; and
      based on determining the transcribed text matches, at least in part, the reference text, reduce at least one of a level of active noise reduction or a level of noise masking to enable a user of the audio output device to hear sounds external to the audio output device; and
    at least one of:
      a noise reduction circuit to reduce the level of active noise reduction in response to the determination, or
      a noise masking circuit to reduce the level of noise masking in response to the determination.

11. The audio output device of claim 10, wherein:
    conditionally processing the transcribed text through a first pass of the three-pass module comprises comparing the transcribed text with the reference text; and
    determining transcribed text matches, at least in part, the reference text when at least one word or number from the transcribed text matches with a corresponding word or number respectively from the reference text.

12. The audio output device of claim 10, wherein conditionally processing the transcribed text through a second pass of the three-pass module comprises:
    converting each word from the transcribed text to corresponding phonemes.

13. The audio output device of claim 12, wherein:
    conditionally processing the transcribed text through the second pass of the three-pass module further comprises comparing phonemes of each word from the transcribed text to phonemes of each word from the reference text; and
    determining the transcribed text matches, at least in part, the reference text when phonemes corresponding to at least one word from the transcribed text matches with phonemes of a word from the reference text.

14. The audio output device of claim 12, wherein:
    conditionally processing the transcribed text through a third pass of the three-pass module comprises determining a degree of similarity for each combination of phonemes corresponding to one word from the transcribed text and phonemes corresponding to one word from the reference text; and
    determining the transcribed text matches, at least in part, the reference text when at least one determined degree of similarity satisfies a threshold degree of similarity.

15. The audio output device of claim 14, wherein the degree of similarity for each combination is represented by an integer.

16. The audio output device of claim 15, wherein the threshold degree of similarity is satisfied when the at least one determined degree of similarity is below a threshold integer value.

17. The audio output device of claim 10, wherein the at least one processor is configured to:
  obtain at least one word, at least one number or a combination thereof as part of the reference text.

18. The audio output device of claim 17, further comprising a communication interface for at least one of:
  receiving at least a portion of the reference text as textual input via a user interface; or
  receiving at least a portion of the reference text as speech input via a user interface, wherein the at least one processor is configured to transcribe the speech input into text for use as part of the reference text.

19. An apparatus for controlling reproduction of external noise in an audio output device, comprising:
  at least one processor configured to:
    obtain reference text comprising at least one word, at least one number or a combination thereof;
    detect a speech signal in the vicinity of the audio output device;
    transcribe the speech signal into text;
    conditionally process the transcribed text through a three-pass module, to determine the transcribed text matches, at least in part, the reference text, wherein processing the transcribed text through each pass of the three-pass module decreases probability of a false negative; and
    based on determining the transcribed text matches, at least in part, the reference text, reduce at least one of a level of active noise reduction or a level of noise masking to enable a user of the audio output device to hear sounds external to the audio output device; and
  a memory coupled to the at least one processor.

20. The apparatus of claim 19, wherein:
conditionally processing the transcribed text through a first pass of the three-pass module comprises comparing the transcribed text with the reference text; and
the transcribed text matches, at least in part, the reference text when at least one word or number from the transcribed text matches with a corresponding word or number respectively from the reference text.

* * * * *